US010324006B2

(12) United States Patent
Gerbaud et al.

(10) Patent No.: US 10,324,006 B2
(45) Date of Patent: Jun. 18, 2019

(54) METHOD FOR DETECTING A MALFUNCTION DURING DRILLING OPERATIONS

(71) Applicants: TOTAL SA, Courbevoie (FR); DRILLSCAN, Montreuil (FR); ARMINES, Paris (FR); VAREL EUROPE, Ibos (FR); GEOSERVICES EQUIPEMENTS, Roissy CDG (FR)

(72) Inventors: Laurent Gerbaud, Aressy (FR); Pierre Leclerc, Saint Gregoire (FR); Philippe Rességuier, Chambery (FR)

(73) Assignees: Drillscan, Villeurbanne (FR); Armines, Paris (FR); Varel Europe, Ibos (FR)

( * ) Notice: Subject to any disclaimer, the term of this patent is extended or adjusted under 35 U.S.C. 154(b) by 172 days.

(21) Appl. No.: 15/103,681

(22) PCT Filed: Dec. 11, 2014

(86) PCT No.: PCT/EP2014/077456
§ 371 (c)(1),
(2) Date: Jun. 10, 2016

(87) PCT Pub. No.: WO2015/086777
PCT Pub. Date: Jun. 18, 2015

(65) Prior Publication Data
US 2016/0313217 A1    Oct. 27, 2016

(30) Foreign Application Priority Data
Dec. 12, 2013  (FR) ..................................... 13 62538

(51) Int. Cl.
*G01V 1/28* (2006.01)
*G01M 99/00* (2011.01)
(Continued)

(52) U.S. Cl.
CPC .......... *G01M 99/008* (2013.01); *E21B 12/02* (2013.01); *E21B 44/00* (2013.01); *E21B 45/00* (2013.01); *E21B 47/00* (2013.01)

(58) Field of Classification Search
CPC .................................................... G01M 99/008
See application file for complete search history.

(56) References Cited

U.S. PATENT DOCUMENTS 4,825,073 A * 4/1989 Smith, Jr. ............... E21B 43/26
                                                    250/260
5,442,173 A * 8/1995 Wraight .................. E21B 43/26
                                                    250/259

(Continued)

FOREIGN PATENT DOCUMENTS

WO   WO 2013036357 A1 *   3/2013   ............. E21B 44/00

Primary Examiner — Hyun D Park
(74) Attorney, Agent, or Firm — Harness, Dickey & Pierce, PLC

(57) ABSTRACT

A method for detecting a malfunction during a drilling operation is carried out by making use of a drill bit, the method including the following: a) the comparison of a first magnitude (E) representative of the mechanical specific energy (MSE), with a first threshold value ($E_{max}$); b) when the first magnitude is greater than the first threshold value, the comparison of the ratio (E/S) between the first magnitude and a second magnitude (S) representative of the drilling force with a second threshold value (($E/S)_{max}$); c) the detection of a malfunction in the drilling operation when the ratio (E/S) between the first magnitude (E) and the second magnitude (S) is greater than the second threshold value (($E/S)_{max}$). The method provides the ability to ensure more precise detection of a malfunction during drilling operations.

21 Claims, 1 Drawing Sheet

(51) Int. Cl.
    *E21B 44/00*     (2006.01)
    *E21B 45/00*     (2006.01)
    *E21B 12/02*     (2006.01)
    *E21B 47/00*     (2012.01)

(56) References Cited

U.S. PATENT DOCUMENTS

| | | |
|---|---|---|
| 9,057,245 B2 | 6/2015 | Wassell |
| 2006/0162962 A1* | 7/2006 | Koederitz ............... E21B 45/00 175/27 |
| 2008/0135290 A1 | 6/2008 | Hopwood et al. |
| 2010/0252325 A1* | 10/2010 | Porche ................. E21B 49/003 175/40 |
| 2012/0123757 A1* | 5/2012 | Ertas ....................... E21B 45/00 703/2 |
| 2012/0138362 A1* | 6/2012 | Koederitz ............... E21B 44/00 175/26 |
| 2013/0105221 A1* | 5/2013 | Wassell .................. E21B 44/00 175/40 |

\* cited by examiner

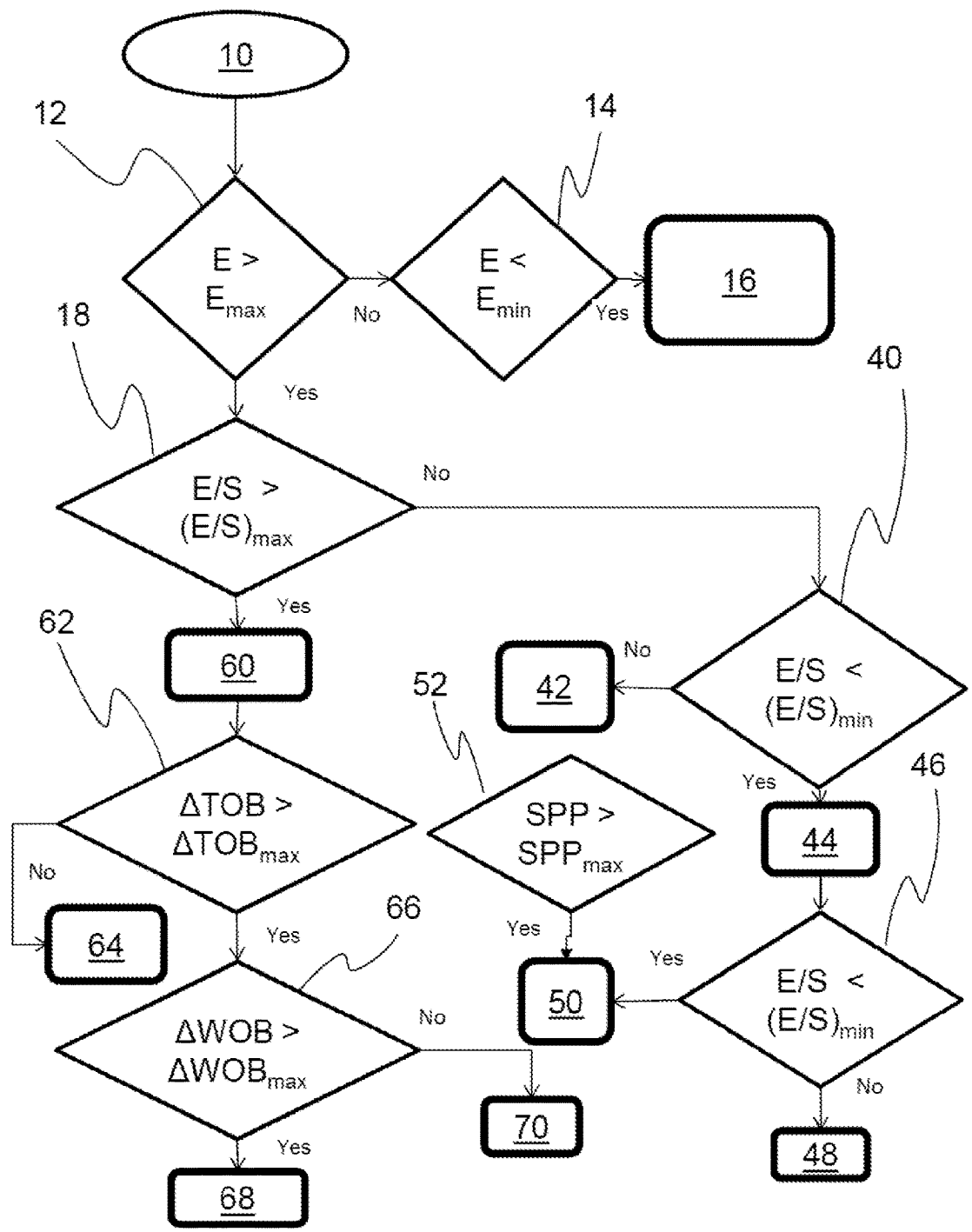

METHOD FOR DETECTING A MALFUNCTION DURING DRILLING OPERATIONS

CROSS-REFERENCE TO RELATED APPLICATIONS

This application is a National Phase Entry of International Patent Application No. PCT/EP2014/077456, filed on Dec. 11, 2014, which claims priority to French Patent Application Ser. No. 1362538, filed on Dec. 12, 2013, both of which are incorporated by reference herein.

BACKGROUND AND SUMMARY

The present invention relates to a method for detecting a malfunction during drilling operations, by making use of two indicators.

In the field of drilling operations, especially in the oil drilling sector, it is a known practice to carry out an analysis of the malfunctions in a drilling operation by means of the analysis of the mechanical specific energy applied in practice during the drilling operation. However, the precision of such known analyses do not appear to be satisfactory. In particular, these known analyses do not provide the ability to differentiate between the passage of the drilling tool from a formation that is softer to formation that is harder and the presence of an actual malfunction during the drilling operation. Furthermore, when malfunction, whether or not real, is identified by making use of these known analyses, the degree of precision and accuracy of these tests is insufficient to enable any determination of the specific type of malfunction that has been encountered in the drilling process.

There is therefore a need to develop a more precise method for detecting a malfunction in drilling operations. To this end, the invention provides a method for detecting a malfunction during a drilling operation carried out by making use of a drill bit, the method including the following:

a) the comparison of a first magnitude representative of the mechanical specific energy, with a first threshold value;

b) when the first magnitude is greater than the first threshold value, the comparison of the ratio between the first magnitude and a second magnitude representative of the drilling force with a second threshold value;

c) the detection of a malfunction in the drilling operation when the ratio between the first magnitude and the second magnitude is greater than the second threshold value.

According to one variant embodiment, prior to the steps a) and b), the method includes the providing of an estimate of at least one of the following variable values:

the rate of penetration of the drill bit;
the weight applied on the drill bit; and
the torque applied to the drill bit;
the first magnitude being calculated based on the torque applied to the drill bit and the rate of penetration of the drill bit; and
the second magnitude being calculated based on the weight applied on the drill bit and the rate of penetration of the drill bit.

According to one variant embodiment, the first magnitude is obtained by using the following equation:

$$E = \frac{120 * \pi * RPM * TOB}{A_B * ROP}$$

where RPM is the number of revolutions per minute of the drill bit;

TOB is the torque applied to the drill bit;
ROP is the rate of penetration of the drill bit;
AB is the surface area of the bore hole.

According to one variant embodiment, the estimate of the torque applied to the drill bit is obtained independently of the weight applied on the drill bit. According to one variant embodiment, the comparisons with the first and second maximum threshold values are performed in real time.

According to one variant embodiment, the method includes, following conclusion of the step c):

d) the determination of a malfunction of the type related to lateral vibration of the drill bit when the variations in the torque applied to the drill bit are lower than a third threshold value.

According to one variant embodiment, the method includes, following conclusion of the step d):

e1) the determination of a malfunction of the type related to the axial vibration of the drill bit when the variations in the weight applied on the drill bit are greater than a fourth threshold value.

According to one variant embodiment, the method includes, following conclusion of the step d):

e2) the determination of a malfunction of the type related to torsional vibration of the drill bit when the variations in weight applied on the drill bit are lower than a fourth threshold value.

According to one variant embodiment, the method includes, following conclusion of the step b), when the ratio between the first magnitude and the second magnitude is lower than the second threshold value:

f) the comparison of the ratio between the first magnitude and the second magnitude with a fifth threshold value;

g) the detection of a malfunction when the ratio between the first magnitude and the second magnitude is lower than the fifth threshold value.

According to one variant embodiment, the method includes, following conclusion of the step g):

h1) the determination of a malfunction of the type related to balling of the drill bit when after the cleaning of the drill bit, the ratio between the first magnitude and the second magnitude is greater than the fifth threshold value.

According to one variant embodiment, the method includes, following conclusion of the step g):

h2) the determination of a malfunction of the type related to wear and tear of the drill bit when after the cleaning of the drill bit, the ratio between the first magnitude and the second magnitude remains lower than the fifth threshold value.

BRIEF DESCRIPTION OF THE DRAWING

Other characteristic features and advantages of the invention will become apparent upon reading the detailed description of the embodiments of the invention that follows, merely given by way of example only and with reference made to the drawing which shows:

a single FIGURE, which is a diagram of an embodiment of a method for detecting a malfunction in drilling operations.

DETAILED DESCRIPTION

The invention relates to a method for detecting a malfunction during a drilling operation. The field of application for this method includes in particular the oil drilling sector, and any other type of drilling operation that is used for the exploration or exploitation of the subsurface. The detection of the malfunction is carried out on a drilling operation by making use of a drill bit as the drilling tool. Various different magnitudes may possibly be obtained from the measurements carried out on the drilling tool, and in particular from the measurements performed at the surface.

The specific mechanical energy (abbreviated as MSE) applied in practice during the drilling operation is in particular included amongst the various variables taken into account by the proposed method for detecting a malfunction. The mechanical specific energy may be expressed by using the following equation:

$$= \frac{120*\pi*RPM*TOB}{A_B*ROP} + \frac{9.81*10^3*WOB}{A_B} \quad (1)$$

where RPM (from the English term Revolutions Per Minute) is the number of revolutions per minute of the drill bit, also known by the term "base RPM";

TOB (from the English term Torque On Bit) is the torque applied to the drill bit in N.m (Newton meter);

WOB (from the English term Weight On Bit) is the weight applied on the drill bit in tonnes;

ROP (from the English term Rate Of Penetration) is the rate of penetration of the drill bit into the ground in m/h; and $A_B$ is the surface area of bore hole in mm$^2$.

The first term, hereinafter referred to as "E", of the equation (1) is linked to the torque applied to the tool whereas the second term is linked to the weight applied to the tool. In this equation (1), the second term contributes only a few percent to the calculated MSE. Thus only E is representative of the MSE applied in practice during the drilling operation. According to the proposed method, E is then used by way of the first magnitude representative of MSE as a first indicator of the malfunctions occurring during the drilling operation. This first magnitude may be obtained directly using the following equation:

$$E = \frac{120*\pi*RPM*TOB}{A_B*ROP} \quad (2)$$

which may be expressed differently as E':

$$E' = \frac{2*TOB}{a^2\delta} \quad (2')$$

wherein a is the radius of the tool; and

δ is the depth of cut, calculated in accordance with the equation:

$$\delta = *ROP/(60*RPM). \quad (3)$$

In the remainder of this document, the conventions E and E' are used interchangeably.

Amongst the other variables that could possibly be obtained during the drilling operation, the proposed method includes the use of a second magnitude representative of the drilling force (as per the English terminology also referred to as *Drilling strength*). The second magnitude may in particular be equal to the drilling strength, hereinafter denoted as "S" in accordance with the following equation:

$$S = \frac{WOB}{a\delta} \quad (4)$$

This second magnitude is used in the malfunction detection method for the determination of a second indicator equal to the ratio between the first magnitude and the second magnitude.

In an alternative manner, other formulas apart from the equations (2), (2'), (3) and (4) may be used in order to obtain an estimate of the first magnitude representative of the mechanical specific energy, and an estimate of the second magnitude representative of the drilling strength. In any case, it is preferred that the first magnitude be calculated based on the TOB and ROP and that the second magnitude be calculated based on the WOB and ROP. In the remainder of this document the first magnitude and the second magnitude are similar to E and S, respectively, with the two indicators then being denoted as E and E/S, respectively.

According to the proposed method, the changes in these two indicators are compared with the threshold values in order to detect the presence of a malfunction. E is compared with a first threshold value, $E_{max}$, and E/S is compared with a second threshold value $(E/S)_{max}$. In order to ensure proper determination of malfunctions, the TOB and WOB, used for the estimation of E and E/S, are obtained in an independent manner. In other words, obtaining of the TOB and WOB in an independent manner makes it possible to ensure that the two indicators E and E/S present uncorrelated changes.

In reference to the single FIGURE provided, the comparisons 12 and 18 may be facilitated by the prior step 10 of plotting E and E/S as a function of time. Where after the comparisons, E is greater than $E_{max}$, and E/S is greater than $(E/S)_{max}$, the method includes the detection, during the step 60, of a malfunction related to the bore hole. This malfunction corresponds to the presence of vibrations on the drill bit. However during this step 60, the type of malfunction is not yet fully determined.

The method illustrated includes the comparison, during the step 62, of the variations in the TOB, these variations being hereinafter denoted as ΔTOB, with a third threshold value hereinafter denoted as $\Delta TOB_{max}$. ΔTOB corresponds to a magnitude representative of the TOB fluctuations over a given period of time. Thus, according to a first variant embodiment, ΔTOB may be the standard deviation of TOB over a period of 10 s (seconds). In this variant, $\Delta TOB_{max}$ may be equal to 10% of the average value of the TOB over this same period of 10 s. According to another equivalent formulation, ΔTOB is the standard deviation of the TOB over the average of TOB over a period of 10 s and $\Delta TOB_{max}$ is equal to 10%.

According to a second variant embodiment, ΔTOB may be equal to the rate of increase in TOB over a given period of time, for example 10 s. In other words, according to this variant ΔTOB may be obtained in accordance with the following equation:

$$\Delta TOB = \frac{TOBt_2 - TOBt_1}{t_2 - t_1} \quad (5)$$

where $t_2$ and $t_1$ are two time instants t, for example separated by an interval of 10 s.

According to this variant ΔTOB or, $TOB_{t1}$ and $TOB_{t2}$ may be averaged over an interval of time limiting the noise. In all cases according to this variant embodiment, $\Delta TOB_{max}$ may be equal to a predetermined percentage, for example 10%.

When ΔTOB is not greater than $\Delta TOB_{max}$, the illustrated method includes, during the step 64, the detection of the probability of malfunction of the type related to lateral vibration of the drill bit (this malfunction as per the English terminology also being referred to as *Bit Whirl*). Moreover, this type of lateral vibration related malfunction may also be determined during the detection of chaotic movements of a drill pipes of the drill bit (as per the English terminology also being referred to as *drill string*). When ΔTOB is greater than $\Delta TOB_{max}$ the method includes a new step 66 of comparison of the variations in the WOB, these variations being hereinafter denoted as ΔWOB, with a fourth threshold value, hereinafter denoted as $\Delta WOB_{max}$. ΔWOB corresponds to a magnitude representative of the WOB fluctuations over a given period of time.

Thus, according to a first variant, ΔWOB may be the standard deviation of the WOB over a period of 10 s. According to this variant, $\Delta WOB_{max}$ may be equal to 10% of the average value of the WOB over this same period of 10 s. According to another equivalent formulation, ΔWOB is the standard deviation of the WOB over the average of the WOB a period of 10 s and $\Delta WOB_{max}$ is equal to 10%.

According to a second variant embodiment, ΔWOB may be equal to the rate of increase in the WOB over a given period of time, for example 10 s. In other words, according to this variant ΔWOB may be obtained in accordance with the following equation:

$$\Delta WOB = \frac{WOBt_2 - WOBt_1}{t_2 - t_1} \quad (6)$$

where $t_2$ and $t_1$ are two time instants t, for example separated by an interval of 10 s.

According to this variant ΔWOB or, $WOB_{t1}$ and $WOB_{t2}$ may be averaged over an interval of time limiting the noise. In all cases according to this variant embodiment, $\Delta WOB_{max}$ may be equal to a predetermined percentage, for example 10%.

In the case where ΔWOB is greater than $\Delta WOB_{max}$, the illustrated method includes the detection, during the step 68, of the probability of malfunction of the type related to axial vibration of the drill bit (this malfunction as per the English terminology also being referred to as *Bit Bouncing*). In the case where ΔWOB is not greater than $\Delta WOB_{max}$, the illustrated method includes, during the step 70, the detection of the probability of malfunction of the type related to torsional vibration of the drill bit (this malfunction as per the English terminology also being referred to as *Stick Slip*).

In accordance with this embodiment of the method illustrated in the only FIGURE provided, the step 12 of comparison of E with $E_{max}$ may precede the step 18 of comparison of E/S with $(E/S)_{max}$. Indeed, it is possible to detect the probability of the absence of malfunction by means of the observation solely of E. Thus, when E is not greater than $E_{max}$, the method includes a step 14 of comparison of E with a minimum threshold value of $E_{min}$. In the case where E is lower than $E_{min}$, this comparison provides the ability to detect, during the step 16, the probability of the passing of the drill bit into a formation of soil that is softer, thus characterising the absence of malfunction of the drill bit.

On the other hand, the observation solely of E/S may not be enough to exclude the presence of a malfunction during the drilling operation. According to the method illustrated, the detection, during the step 42, of the probability of the passing of the drill bit into a formation of soil that is harder, also characterising the absence of malfunction of the drill bit, is possible when, after comparison of E during the step 12, the comparisons of E/S during the steps 18 and 40 show that E/S is comprised between $(E/S)_{min}$ and $(E/S)_{max}$, $(E/S)_{min}$ corresponding to a fifth threshold value. Thus, with a view to detecting the absence of malfunction, the method of detection is more rapid when the step 12 of comparison of E precedes the step 18 of comparison of E/S. However, according to an alternative the order of the steps 12 and 18 may be reversed or even the steps 12 and 18 may be performed in simultaneous fashion.

In the event that the comparison during the step 40 shows that E/S is lower than $(E/S)_{min}$, after the comparison during the step 18 of E/S and $(E/S)_{max}$ according to the method illustrated, the method includes a step 44 of detection of a malfunction. In such a case of detection of a malfunction, the kind of malfunction detected may include such types as balling of the drill bit or wear and tear of the drill bit.

The method then includes the step 46 in order to try to determine whether E/S remains irreversibly lower than $(E/S)_{min}$. When the malfunction detected during the step 44 is irreversible, the method detects, during the step 48 the probability of a malfunction type such as wear and tear of the drill bit. When the malfunction detected during the step 44 is reversible, the method detects, during the step 50 the probability of a malfunction type such as balling of the drill bit. The determination of the reversibility or irreversibility during the step 46 may be performed after the attempt to clean the drill bit, for example by means of raising of the drill bit by a few meters with a quick rotation for the cleaning thereof. Furthermore, the method may also include the detection of the probability of a malfunction type such as balling of the drill bit, when the pressure used by the drilling muds is higher than a threshold value. With reference to the sole FIGURE, this detection is enabled by the comparison during the step 52 of the pressure of the drilling muds, denoted as SPP (abbreviated from the accepted English term Stand Pipe Pressure) with a threshold value denoted as $SPP_{max}$.

Determining the estimates for the indicators E, E/S, as well as for WOB, TOB and SPP and the comparison thereof with their respective threshold values may advantageously be performed in real time, during the course of drilling operations. In this document, the term "real time", is used to refer to the performing of an action in accordance with a given frequency equal or proportional to the frequency of measurements performed during the course of drilling operations. The actions in real time for example, correspond to the actions performed at a frequency greater than 0.1 Hz and preferably greater than 1 Hz.

Determining the estimates for E, E/S are performed in real time on the basis of obtaining the RPM, WOB, TOB and ROP in real time. The real time comparisons of the malfunction indicators E, E/S, as well as of WOB, TOB and SPP with the threshold values provide the ability to ensure detection of a malfunction of the drill bit at the very moment in time when this malfunction occurs during the use of the drill bit. Such real time detection ensures the ability to take countermeasures during the drilling operation, by acting on the drilling parameters or by making the decision to raise the drill bit. These responsive actions serve to limit the damage to the drill bit or to enable the optimisation of the ROP of the drill bit into the ground.

Moreover, the determination of the type of malfunction in real time provides the ability in particular to diagnose whether the malfunction of the drill bit is reversible or irreversible. The very precise determination of reversibility made possible by the proposed method then provides the ability to avoid unnecessary manoeuvres for changing the drill bit that could take up to 24 hours. Reversible types of malfunctions are in particular all of the malfunctions related to vibration and the malfunction involving balling of the drill tool.

The various different threshold values mentioned here above, in particular including $E_{max}$, $E_{min}$, $(E/S)_{max}$, $\Delta TOB_{max}$, $\Delta WOB_{max}$, $(E/S)_{min}$, $SPP_{max}$, may be established on the bases of previous drilling operation results, and/or the characteristics of the drill bit, and/or the records and logs of known geological formations of the terrain to drilled. The variables RPM, WOB, TOB, SPP and ROP may be obtained by means of performing surface measurements that thereby enable the determination of the malfunctions of the drill bit despite the absence of measurements performed at the bottom of the drilled hole. However, when they are available measurements performed at the bore hole bottom in real time may be used, for example for the WOB, TOB or RPM.

Quite obviously, the present invention is not limited to the examples and embodiments described and represented, but rather it is capable of lending itself to numerous variants accessible to the person skilled in the art. In particular, by way of an alternative for all previous embodiments, the determination of the instances of exceeding the threshold values may be effected by using broad unequal relations, that is to say non rigid. Thus, according to these alternatives, the terms "greater/higher" and "lower/less" previously used above may be understood to signify respectively "greater/higher than or equal to" and "lower/less than or equal to".

The invention claimed is:

1. A method for detecting a malfunction during an oil drilling operation carried out by making use of a drill bit as an oil drilling tool, the method comprising:
   a) obtaining various different magnitudes from measurements performed at a surface and carried out on the oil drilling tool;
   b) a comparison of a first magnitude representative of a mechanical specific energy, with a first threshold value;
   c) when the first magnitude is greater than the first threshold value, a comparison of a ratio between the first magnitude and a second magnitude representative of a drilling force with a second threshold value; and
   d) a detection of a malfunction in the oil drilling operation when the ratio between the first magnitude and the second magnitude is greater than the second threshold value.

2. The malfunction detection method according to claim 1, further comprising, prior to the steps b) and c), providing of an estimate of at least one of the following variable values:
   a rate of penetration of the drill bit;
   a weight applied on the drill bit; and
   a torque applied to the drill bit;
   the first magnitude being calculated based on the torque applied to the drill bit and the rate of penetration of the drill bit; and
   the second magnitude being calculated based on the weight applied on the drill bit and the rate of penetration of the drill bit.

3. The malfunction detection method according to claim 2, wherein the first magnitude is obtained by using the following equation:

$$E = \frac{120 * \pi * RPM * TOB}{A_B * ROP}$$

where RPM is a number of revolutions per minute of the drill bit;
TOB is the torque applied to the drill bit;
ROP is the rate of penetration of the drill bit; and
AB is a surface area of a bore hole.

4. The malfunction detection method according to claim 2, wherein an estimate of the torque applied to the drill bit is obtained independently of the weight applied on the drill bit.

5. The malfunction detection method according to claim 1, wherein the comparisons with the first and second maximum threshold values are performed in real time.

6. The malfunction detection method according to claim 5, further comprising, following conclusion of the step d):
   e) a determination of a malfunction of a type related to lateral vibration of the drill bit when the variations in a torque applied to the drill bit are lower than a third threshold value.

7. The malfunction detection method according to claim 6, further comprising, following conclusion of the step e):
   f) a determination of a malfunction of a type related to axial vibration of the drill bit when variations in a weight applied on the drill bit are greater than a fourth threshold value.

8. The malfunction detection method according to claim 6 further comprising, following conclusion of the step e):
   g) a determination of a malfunction of a type related to torsional vibration of the drill bit when the variations in a weight applied on the drill bit are lower than a fourth threshold value.

9. The malfunction detection method according to claim 1, further comprising, following conclusion of the step c), when the ratio between the first magnitude and the second magnitude is lower than the second threshold value:
   h) the comparison of the ratio between the first magnitude and the second magnitude and the second magnitude is lower than the fifth threshold value.

10. The malfunction detection method according to claim 9, further comprising, following conclusion of the step h):
    i) a determination of a malfunction of a type related to balling of the drill bit when after a cleaning of the drill bit, the ratio between the first magnitude and the second magnitude is greater than the fifth threshold value.

11. The malfunction detection method according to claim 9, further comprising, following conclusion of the step h):
    i) a determination of a malfunction of a type related to wear and tear of the drill bit when after a cleaning of the drill bit, the ratio between the first magnitude and the second magnitude remains lower than the fifth threshold value.

12. A method for detecting a malfunction during an oil drilling operation carried out by making use of a drill bit as an oil drilling tool, the method comprising:
    a) obtaining various different magnitudes from measurements performed at a surface and carried out on the oil drilling tool;
    b) comparing a first magnitude representative of mechanical specific energy, with a first threshold value;
    c) when the first magnitude is greater than the first threshold value, comparing a ratio between the first magnitude and a second magnitude representative of a drilling force with a second threshold value;
    d) detecting a malfunction in the oil drilling operation when the ratio between the first magnitude and the second magnitude is greater than the second threshold value,
    wherein the malfunction detection method further comprises, prior to the steps b) and c), providing of an estimate of at least one of the following variable values:
    (i) a rate of penetration of the drill bit;
    (ii) a weight applied on the drill bit; and
    (iii) a torque applied to the drill bit;
    e) calculating the first magnitude based on the torque applied to the drill bit and the rate of penetration of the drill bit; and f) calculating the second magnitude based on the weight applied on the drill bit and the rate of penetration of the drill bit.

13. The malfunction detection method according to claim 12, wherein the first magnitude is obtained by using the following equation:

$$E = \frac{120 * \pi * RPM * TOB}{A_B * ROP}$$

where RPM is the number of revolutions per minute of the drill bit; TOB is the torque applied to the drill bit; ROP is the rate of penetration of the drill bit; and AB is a surface area of a bore hole.

14. The malfunction detection method according to claim 12, wherein an estimate of the torque applied to the drill bit is obtained independently of the weight applied on the drill bit.

15. The malfunction detection method according to claim 12, further comprising, following conclusion of the step d):
g) determining a malfunction of a type related to lateral vibration of the drill bit when variations in the torque applied to the drill bit are lower than a third threshold value.

16. The malfunction detection method according to claim 15, further comprising, following conclusion of the step g):
h) determining a malfunction of a type related to axial vibration of the drill bit when variations in the weight applied on the drill bit are greater than a fourth threshold value.

17. The malfunction detection method according to claim 15 further comprising, following conclusion of the step g):
i) determining a malfunction of a type related to torsional vibration of the drill bit when variations in weight applied on the drill bit are lower than a fourth threshold value.

18. The malfunction detection method according to claim 12, wherein, following conclusion of the step c), when the ratio between the first magnitude and the second magnitude is lower than the second threshold value:

i) the comparison of the ratio between the first magnitude and the second magnitude with a fifth threshold value; and
k) the detection of a malfunction when the ratio between the first magnitude and the second magnitude is lower than the fifth threshold value.

19. The malfunction detection method according to claim 18, further comprising, following conclusion of the step k):
l) determining a malfunction of a type related to balling of the drill bit when after cleaning of the drill bit, the ratio between the first magnitude and the second magnitude is greater than the fifth threshold value.

20. The malfunction detection method according to claim 18, further comprising, following conclusion of the step k):
m) determining a malfunction of a type related to wear and tear of the drill bit when after cleaning of the drill bit, the ratio between the first magnitude and the second magnitude remains lower than the fifth threshold value.

21. A method for drilling a bore hole, comprising:
deploying a drill string into the bore hole, the drill string comprising drill pipes and a drill bit;
applying torque and weight to the drill bit while the drill bit is engaged with a formation adjacent to the bore hole, thereby penetrating the formation; and
while penetrating the formation:
calculating a mechanical specific energy of the drill bit;
comparing the mechanical specific energy to a first threshold value;
in response to the mechanical specific energy being greater than the first threshold value:
calculating a ratio between the mechanical specific energy and a drilling force; and
comparing the ratio to a second threshold value;
detecting a malfunction in response to the ratio being greater than the second threshold value; and
taking countermeasures in response to detection of the malfunction by at least one of: adjusting drilling parameters, and raising the drill bit from engagement with the formation.

* * * * *